(12) United States Patent
Sato et al.

(10) Patent No.: US 10,698,494 B2
(45) Date of Patent: Jun. 30, 2020

(54) TACTILE SENSATION PRESENTING DEVICE

(71) Applicant: ALPS ALPINE CO., LTD., Tokyo (JP)

(72) Inventors: Kunio Sato, Miyagi (JP); Daisuke Takai, Miyagi (JP); Yuzuru Kawana, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/516,392

(22) Filed: Jul. 19, 2019

(65) Prior Publication Data

US 2019/0339782 A1 Nov. 7, 2019

Related U.S. Application Data

(63) Continuation of application No. PCT/JP2018/001987, filed on Jan. 23, 2018.

(30) Foreign Application Priority Data

Feb. 6, 2017 (JP) .................. 2017-019193

(51) Int. Cl.
*G06F 3/01* (2006.01)
*G06F 3/044* (2006.01)
*G05G 9/047* (2006.01)

(52) U.S. Cl.
CPC ............. *G06F 3/016* (2013.01); *G05G 9/047* (2013.01); *G06F 3/0444* (2019.05); *G06F 2203/015* (2013.01)

(58) Field of Classification Search
CPC .. G06F 3/016; G06F 3/0444; G06F 2203/015; G05G 9/047
See application file for complete search history.

(56) References Cited

U.S. PATENT DOCUMENTS

2009/0120105 A1* 5/2009 Ramsay .................. G06F 3/011
62/3.3
2013/0082829 A1 4/2013 Seki et al.
(Continued)

FOREIGN PATENT DOCUMENTS

JP H07-072018 3/1995
JP 2004-157749 6/2004
(Continued)

OTHER PUBLICATIONS

International Search Report for PCT/JP2018/001987 dated Feb. 27, 2018.

*Primary Examiner* — Joseph H Feild
*Assistant Examiner* — Rufus C Point
(74) *Attorney, Agent, or Firm* — IPUSA, PLLC

(57) ABSTRACT

A tactile sensation presenting device includes: a pressure sensation generating unit configured to present pressure information; and a tactile sensation generating unit arranged on the pressure sensation generating unit. The tactile sensation generating unit includes a vibrating element configured to present vibration information; a warmth/coldness presenting element provided above the vibrating element and configured to present warm/cold information. The vibration information, the warm/cold information, and the pressure information are presented to an operating part in contact with a tactile sensation presentation surface of the tactile sensation generating unit.

11 Claims, 12 Drawing Sheets

(56) References Cited

U.S. PATENT DOCUMENTS

| | | | |
|---|---|---|---|
| 2014/0333573 A1* | 11/2014 | Hong | G06F 3/016 |
| | | | 345/174 |
| 2016/0328985 A1* | 11/2016 | Endo | G06F 3/041 |
| 2017/0322628 A1* | 11/2017 | Tan | G06F 3/0346 |
| 2019/0064927 A1* | 2/2019 | Tachi | G06F 3/03543 |
| 2019/0265829 A1* | 8/2019 | Sato | G06F 3/01 |
| 2019/0278374 A1* | 9/2019 | Sato | G01K 13/04 |
| 2019/0339782 A1* | 11/2019 | Sato | G06F 3/0444 |
| 2019/0339783 A1* | 11/2019 | Sato | G06F 3/045 |

FOREIGN PATENT DOCUMENTS

| | | |
|---|---|---|
| JP | 2007-026297 | 2/2007 |
| JP | 2010-204741 | 9/2010 |
| JP | 2013-080327 | 5/2013 |
| JP | 2014-102660 | 6/2014 |

* cited by examiner

FIG.2
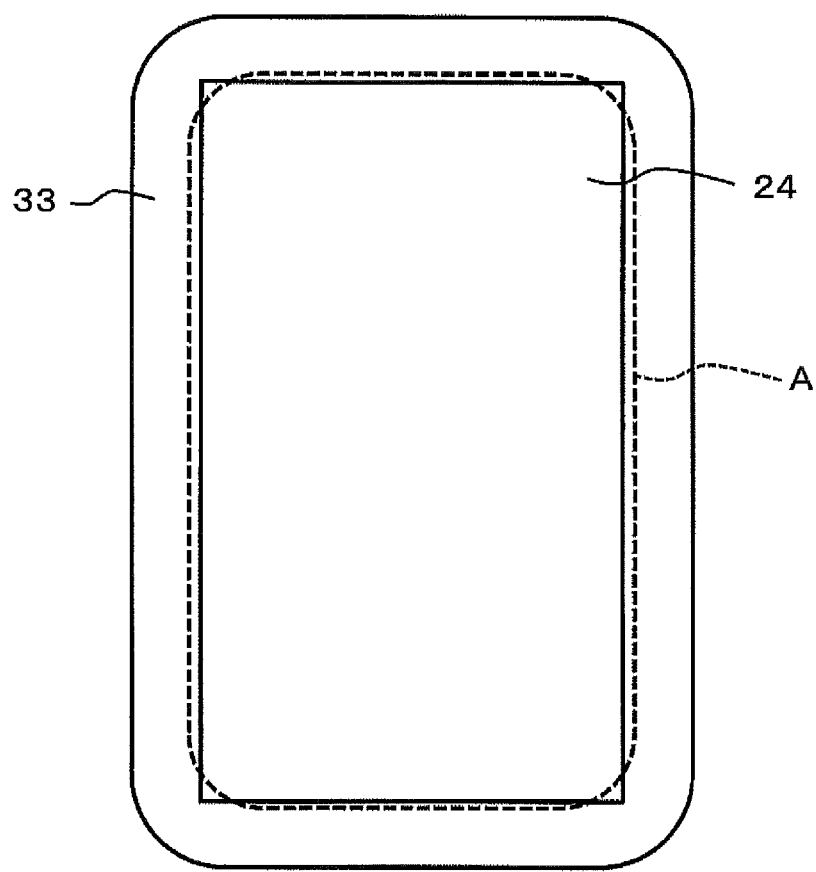
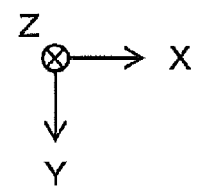

TACTILE SENSATION PRESENTING DEVICE

CROSS-REFERENCE TO RELATED APPLICATIONS

This application is a continuation of International Application No. PCT/JP2018/001987, filed on Jan. 23, 2018 and designated the U.S., which claims priority to Japanese Patent Application 2017-019193, filed on Feb. 6, 2017. The contents of these applications are incorporated herein by reference in their entirety.

BACKGROUND OF THE INVENTION

1. Field of the Invention

The present invention relates to a tactile sensation presenting device for presenting warm/cold information and vibration information when touched by an operating part such as a finger.

2. Description of the Related Art

Patent Document 1 describes a device in which a tactile sensation presenting device that generates vibration by a voice coil, a piezoelectric element, or the like, a Peltier element that presents a warm sensation, and a sensor that measures a temperature of skin are disposed on a base. The tactile sensation presenting device and the sensor are directly disposed on the base, and the Peltier element is disposed on the tactile sensation presenting device. According to this configuration, not only vibration but also an effect of temperature can be provided when a tactile sensation is presented. Thus, a tactile sensation transmitting device having higher expressiveness can be realized.

RELATED-ART DOCUMENTS

[Patent Document 1] Japanese Laid-open Patent Publication No. H07-072018

However, in the tactile sensation transmitting device described in Patent Document 1, although it is possible to present both vibration and warm sensation simultaneously, one set of vibration information and one warm sensation can only be presented. Therefore, for example, in expressing a texture or a temperature sensation corresponding to an actual article or movement or deformation when applying force to the article, fineness of tactile sensation presentation, richness of expression, and accuracy are insufficient.

Accordingly, an object of the present invention is to provide a tactile sensation presenting device that can present a finer tactile sensation.

SUMMARY OF THE INVENTION

In order to solve the above described problem, a tactile sensation presenting device according to an aspect of the present invention includes: a pressure sensation generating unit configured to present pressure information; and a tactile sensation generating unit arranged on the pressure sensation generating unit, wherein the tactile sensation generating unit includes a vibrating element configured to present vibration information; wherein the tactile sensation generating unit includes a warmth/coldness presenting element provided above the vibrating element and configured to present warm/cold information, and wherein the vibration information, the warm/cold information, and the pressure information are presented to an operating part in contact with a tactile sensation presentation surface of the tactile sensation generating unit.

Thereby, because the vibration information, the warm/cold information, and the pressure information can be presented, a finer tactile sensation can be presented. Also, a new tactile sensation can be presented that cannot be obtained by vibration information, warm/cold information, or pressure information alone.

In the tactile sensation presenting device according to an aspect of the present invention, it is preferable that the tactile sensation presenting device includes an operation information obtaining unit configured to obtain operation information of the operating part in contact with the tactile sensation presentation surface, and at least one of the vibration information, the warm/cold information, and the pressure information is controlled based on the operation information obtained by the operation information obtaining unit.

Thereby, because presented information is controlled based on the obtained operation information, a more complex tactile sensation can be presented. Also, because control conditions can be changed according to the state of the operating part, the efficiency and speed of control can be enhanced. As a result, a finer tactile sensation can be presented.

In the tactile sensation presenting device according to an aspect of the present invention, it is preferable that the pressure sensation generating unit includes an orientation control unit configured to control an orientation of the tactile sensation presentation surface based on the operation information. The orientation control unit can tilt the tactile sensation presentation surface and/or vertically move the tactile sensation presentation surface.

Thereby, because various kinds of pressure information can be provided, more complex and finer tactile sensation can be presented.

In the tactile sensation presenting device according to an aspect of the present invention, it is preferable that the pressure sensation generating unit includes a shape control unit configured to control a shape of the tactile sensation presentation surface based on the operation information. The shape control unit may include a plurality of vertically movable thrust pins and vertically move the plurality of respective thrust pins to change the shape of the tactile sensation presentation surface.

Thereby, a new tactile sensation can be presented that cannot be obtained by vibration information, warm/cold information, or pressure information alone.

In the tactile sensation presenting device according to an aspect of the present invention, it is preferable that the warmth/coldness presenting element is a Peltier element.

Thereby, it is possible to present efficiently the warm/cold information.

In the tactile sensation presenting device according to an aspect of the present invention, it is preferable that a conductive member is arranged between the Peltier element and the vibrating element, the conductive member includes a thermally conductive member that conducts, to the vibrating element, heat that is generated when the Peltier element presents the warm/cold information, and the conductive member includes a vibration conductive member that conducts, to the Peltier element, the vibration information presented by the vibrating element.

Thereby, the vibration information by the vibrating element can be efficiently transmitted to the surface of the Peltier element. Also, the heat dissipation effect can be enhanced by efficiently conducting the heat from the Peltier element to the vibrating element, and tactile sensation presentation with fast switching can be realized.

In the tactile sensation presenting device according to an aspect of the present invention, it is preferable that the conductive member has an adhesive property, and couples the Peltier element to the vibrating element.

Thereby, the vibration information presented by the vibrating element can be efficiently transmitted to the Peltier element. Also, the heat generated by the Peltier element can be efficiently dissipated.

In the tactile sensation presenting device according to an aspect of the present invention, it is preferable that the vibrating element includes a metal cover, and the conductive member couples the metal cover and the Peltier element.

Thereby, the heat generated by the Peltier element can be further efficiently dissipated.

According to an aspect of the present invention, because it is possible to present vibration information, warm/cold information, and pressure information, it is possible to present a finer tactile sensation.

BRIEF DESCRIPTION OF THE DRAWINGS

FIG. 2 is a plan view of the tactile sensation presenting device that is illustrated in FIG. 1;

DETAILED DESCRIPTION OF THE PREFERRED EMBODIMENTS

In the following, tactile sensation presenting devices according to embodiments of the present invention will be described in detail with reference to the drawings.

First Embodiment

Figure 1:
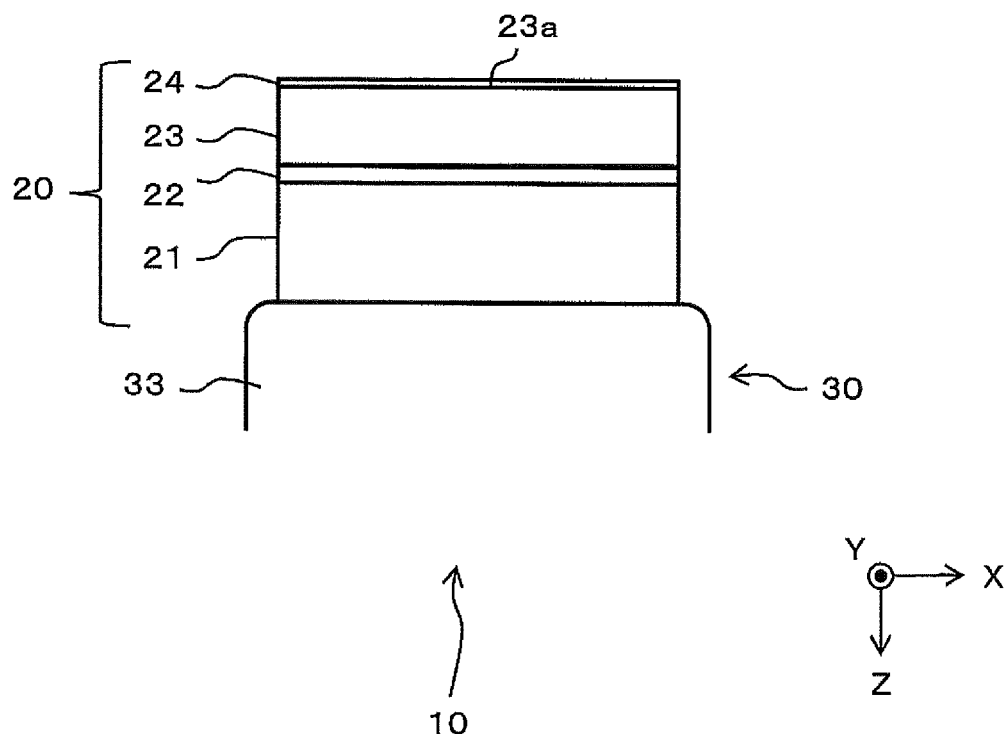
FIG. 1 is a side view illustrating a schematic configuration of a tactile sensation presenting device according to a first embodiment of the present invention.
Figure 3:
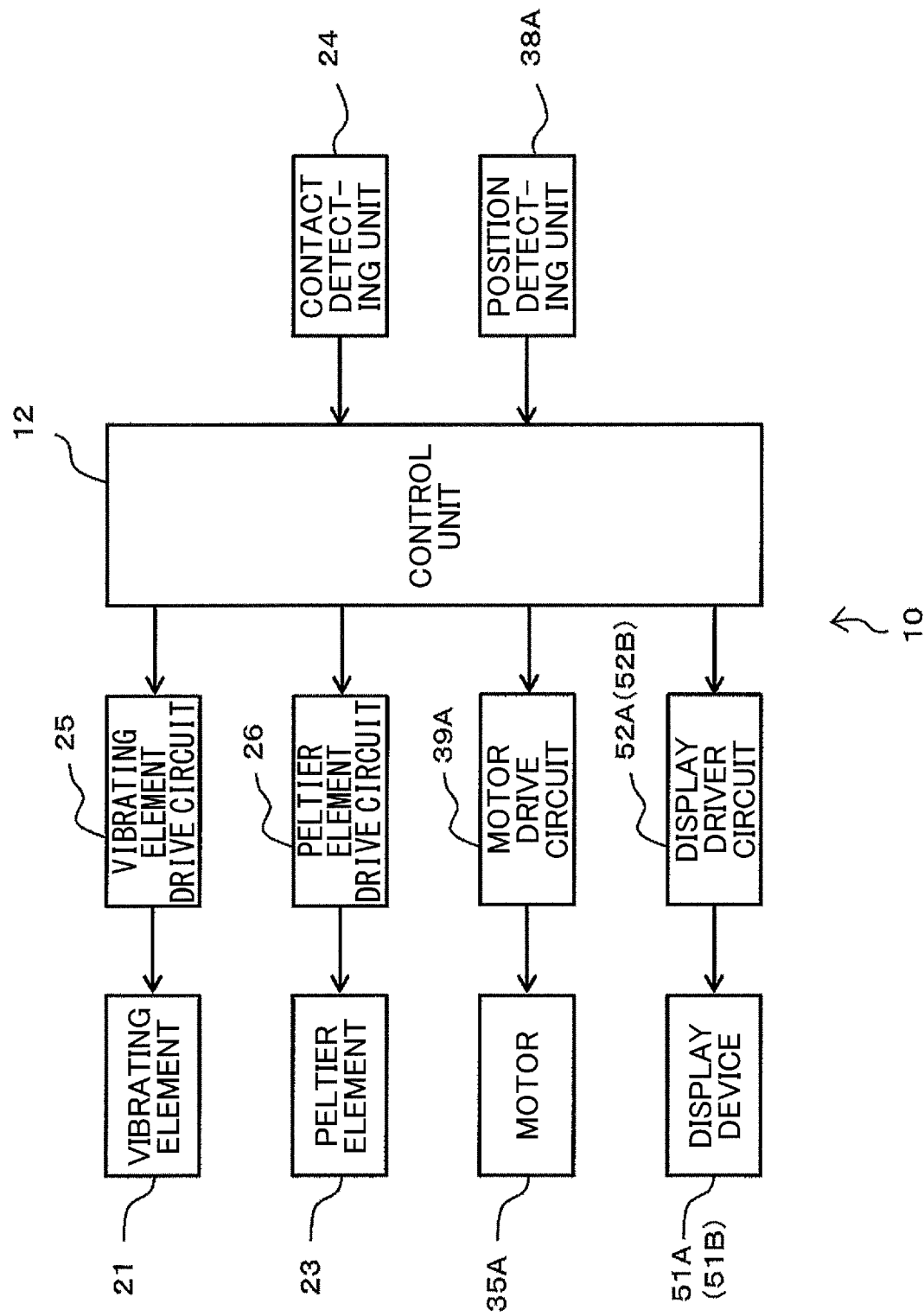
FIG. 3 is a functional block diagram of the tactile sensation presenting device.

FIG. 1 is a side view illustrating a schematic configuration of a tactile sensation presenting device 10 according to a first embodiment; FIG. 2 is a plan view of the tactile sensation presenting device 10 that is illustrated in FIG. 1; and FIG. 3 is a functional block diagram of the tactile sensation presenting device 10. In each drawing, X-Y-Z coordinates are illustrated as reference coordinates. In the following description, a state viewed from the upper side to the lower side in the Z direction may be referred to as plan view, and the Z direction is a direction perpendicular to an X-Y plane.

As illustrated in FIG. 1 and FIG. 2, the tactile sensation presenting device 10 includes a pressure sensation generating unit 30 (pressure sensation generating unit 30A, 30B, 30C in FIG. 6A) and a tactile sensation generating unit 20 is arranged on a support 33 (33A, 33B, 33C in FIG. 6A) of the pressure sensation generating unit 30.

As illustrated in FIG. 1, a vibrating element 21 is placed on the support 33 of the pressure sensation generating unit 30. Above the vibrating element 21, a Peltier element 23 as a warmth/coldness presenting element is placed via a conductive member 22. Further, a contact detecting unit 24 as an operation information obtaining unit is provided on the surface 23a of the Peltier element 23. The tactile sensation generating unit 20 includes the vibrating element 21, the conductive member 22, the Peltier element 23, and the contact detecting unit 24.

As illustrated in FIG. 3, a detection result by the contact detecting unit 24 is output to the control unit 12, and the control unit 12 outputs, to a vibrating element drive circuit 25, a Peltier element drive circuit 26, a motor drive circuit 39A, and display driver circuits 52A and 52B, respective control signals that are independent from each other.

The vibrating element 21 has a configuration in which, for example, a vibrator is supported by an elastic member such as a leaf spring in a metal case or cover so as to be able to vibrate freely. A coil is wound around the vibrator, and a magnet facing the coil is fixed in the case. When the control unit 12, which serves as a vibration control unit, applies, a control signal to the vibrating element drive circuit 25, the vibrating element drive circuit 25 applies, as a drive signal, an alternate current to the coil in the vibrating element 21. Thereby, the vibrator of the vibrating element 21 vibrates such that vibration information can be presented.

When the control unit 12 applies a control signal to the vibrating element drive circuit 25, the vibrating element drive circuit 25 outputs, based on the received signal, a drive signal to the vibrating element 21. The drive signal may, for example, set a frequency, a pulse width, and an amplitude of drive pulses so that various fine tactile sensations are presented on the surface of the tactile sensation generating unit 20.

In addition, the control signal that is applied by the control unit 12 to the vibrating element drive circuit 25 may be changed in accordance with the detection result of the contact detecting unit 24 or the like.

The vibrating element 21 may have a configuration in which a vibrator is formed of a magnet and a coil facing the vibrator is fixed in a case. Also, the vibrating element 21 may be a piezoelectric element that is configured to vibrate in accordance with a control signal from the control unit 12.

The conductive member 22 is, for example, an adhesive tape material, such as a double sided tape. The conductive member 22 is arranged to cover the upper surface of the vibrating element 21. By the adhesiveness of the conductive member 22, the conductive member 22 is fixed on the vibrating element 21 and the Peltier element is fixed on the conductive member 22. By the conductive member 22, the vibrating element 21 and the Peltier element 23 are coupled to each other.

The conductive member 22 serves as a thermally conductive member to conduct, to a metal case of the vibrating element 21, heat that is generated when the Peltier element 23 presents warm/cold information. Also, the conductive member 22 serves as a vibration conductive member to conduct, to the Peltier element 23, vibration information presented by the vibrating element 21.

In this manner, because the conductive member 22 has an adhesive property and a vibrational conductivity, the vibration information presented by the vibrating element 21 can be efficiently transmitted via the Peltier element 23 to the surface (upper side surface in the Z direction in FIG. 1) of the contact detecting unit 24. Further, because the conductive member 22 has a thermal conductivity, heat generated by the Peltier element 23 can be diffused by itself. In addition, the heat can be efficiently conducted from the back surface (lower surface in the Z direction) of the Peltier element 23 particularly to the metal case of the vibrating element 21, and the heat dissipation efficiency can be enhanced by using the metal case as a heat sink.

For example, the Peltier element 23, which serves as a warmth/coldness presenting element, utilizes heat transfer of the Peltier effect that occurs when DC current is applied from a Peltier element drive circuit 26 to a junction of two metal plates facing each other in the Z direction, and the heat quantity on the surfaces of the two metal plates changes in accordance with a direction of the current. The current as a drive signal applied from the Peltier element drive circuit 26 to the Peltier element 23 is generated based on a control signal applied from the control unit 12. By controlling the direction and the amount of current applied to the Peltier element 23, it is possible to cause a finger touching the Peltier element 23 to sense a warm temperature or a cold temperature, and it is possible to present fine warm/cold information. Here, as the warmth/coldness presenting element, other than the Peltier element, a thermoelectric element using the Thomson effect may be used. Alternatively, in place of the warmth/coldness presenting element, an element that presents warm information, such as a heater, may be used, for example.

As illustrated in FIG. 1, the contact detecting unit 24 is fixed to the surface 23a of the Peltier element 23. The contact detecting unit 24 has a thin structure so that heat of the Peltier element 23 can be transferred to a finger as an operating part.

The upper surface of the contact detecting unit 24 constitutes a tactile sensation presentation surface that is contactable by a finger as an operating part. The contact detecting unit 24 includes a substrate of a resin film attached on the Peltier element 23. As the substrate of the resin film, a thin material is used to facilitate thermal conduction. The contact detecting unit 24 is an electrostatic detecting unit, and is of a mutual capacitive detecting type in which a plurality of electrode layers insulated each other are provided on the substrate are or a self-capacitive detecting type in which a single electrode layer is provide on the substrate. By a change in the electrostatic capacity between an electrode and a finger that is an operating part, or a change in the electrostatic capacity between a plurality of electrodes, it is possible to detect that the finger has contacted the contact detecting unit 24. Further, in a mutual capacitive detecting type, it is possible to detect which coordinate position of the contact detecting unit 24 is touched by a finger, and as an operation information obtaining unit, it is possible to detect (obtain) operation information including movement of a finger by detecting the contact position for every predetermined elapsed time.

As illustrated in FIG. 3, a detection result by the contact detecting unit 24 is output to the control unit 12. Based on the detection result, the control unit 12 (1) applies a control signal to the vibrating element drive circuit 25 for presenting vibration information; (2) applies a control signal to the Peltier element drive circuit 26 for presenting warm/cold information; (3) applies a control signal to the motor drive circuit 39A to operate a motor 35A of the pressure sensation generating unit 30A; and (4) applies a control signal to the display driver circuits 52A and 52B for causing display devices 51A and 51B to display an image corresponding to the detection result. As a result, a tactile sensation including the vibration information generated by driving the vibrating element 21, the warm/cold information generated by the Peltier element 23, and the pressure information generated by driving the motor 35A is presented to a finger contacting the contact detecting unit 24A, and also the image corresponding to an operation of the finger as an operator part is displayed on the display devices 51A and 51B.

Note that in a case where the pressure sensation generating unit 30 is configured to function as a pushbutton, upon the pushbutton being pushed, a switch or a sensor inside an operation device may operate to detect that the push-button is pushed. In this case, because the switch or the sensor inside the operation device serves as a detecting unit, the contact detecting unit 24 on the surface of the Peltier element 23 may be omitted.

Further, it is preferable to provide a temperature sensor in the contact detecting unit 24 to measure a surface temperature of the Peltier element 23 to adjust, based on the difference between the measured temperature and a set temperature, a control signal that is applied to the Peltier element 23.

In a plan view as illustrated in FIG. 2, the area where the contact detecting unit 24 is provided, that is, the outer shape of the tactile sensation presentation surface approximately matches the contact area A corresponding to an operation surface of a finger as an operating part. Here, the operation surface of the finger is the pad of the finger, and the contact area A corresponds to the range where the pad of the finger contacts the contact detecting unit 24. It is most preferable that the size and the outer shape of the area where the contact detecting unit 24 is provided are the same as those of the contact area A. However, the contact area A may be wider than the area of the contact detecting unit 24, or the area of the contact detecting unit 24 may be wider than the contact area A. Note that it is preferable that the area where a finger contacts the contact detecting unit 24 is 50% or more.

Figure 4:
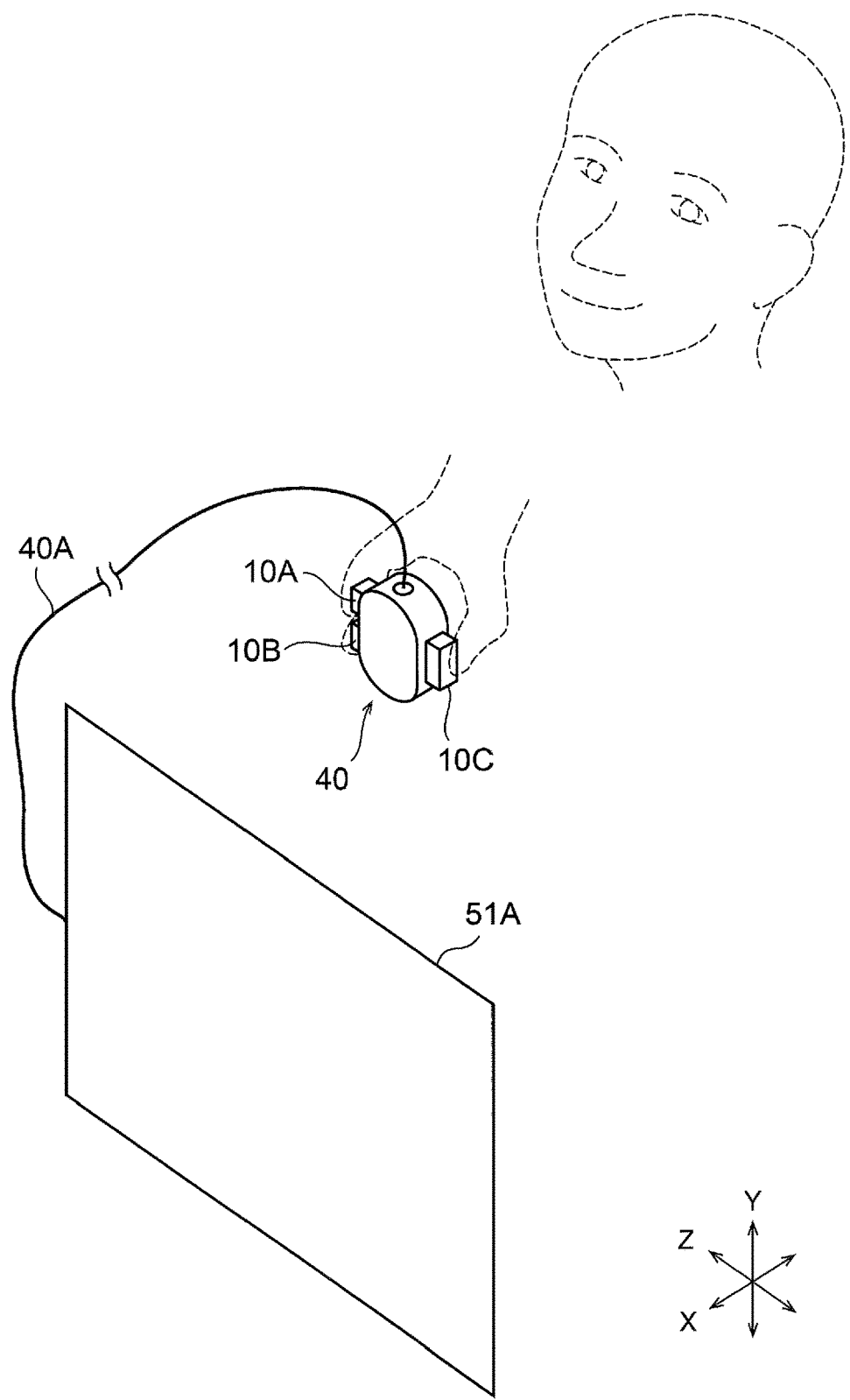
FIG. 4 is a diagram illustrating an example of first use of an input device and a display device.
Figure 5:
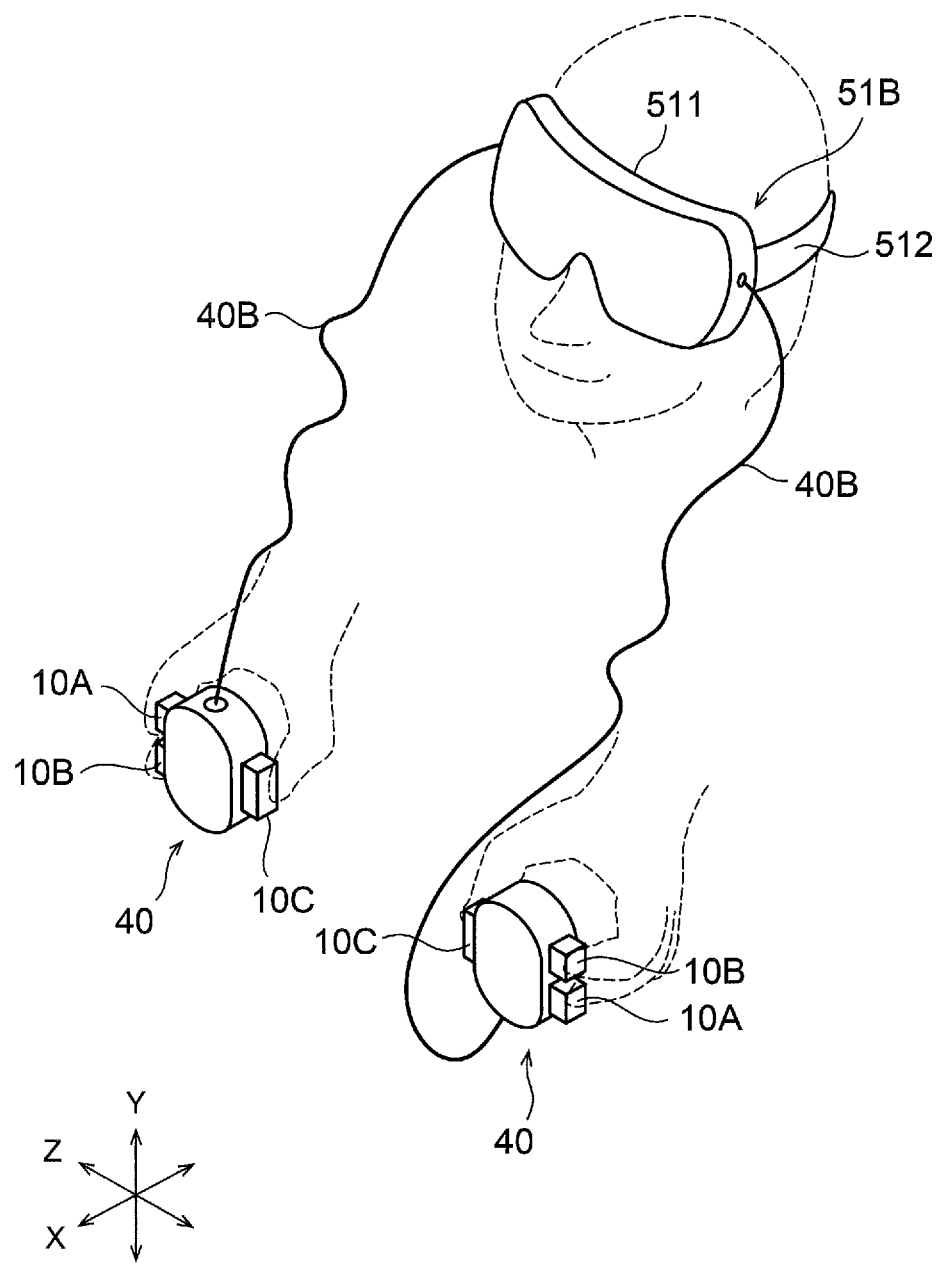
FIG. 5 is a diagram illustrating an example of second use of input devices and a display device.
Figure 6A:
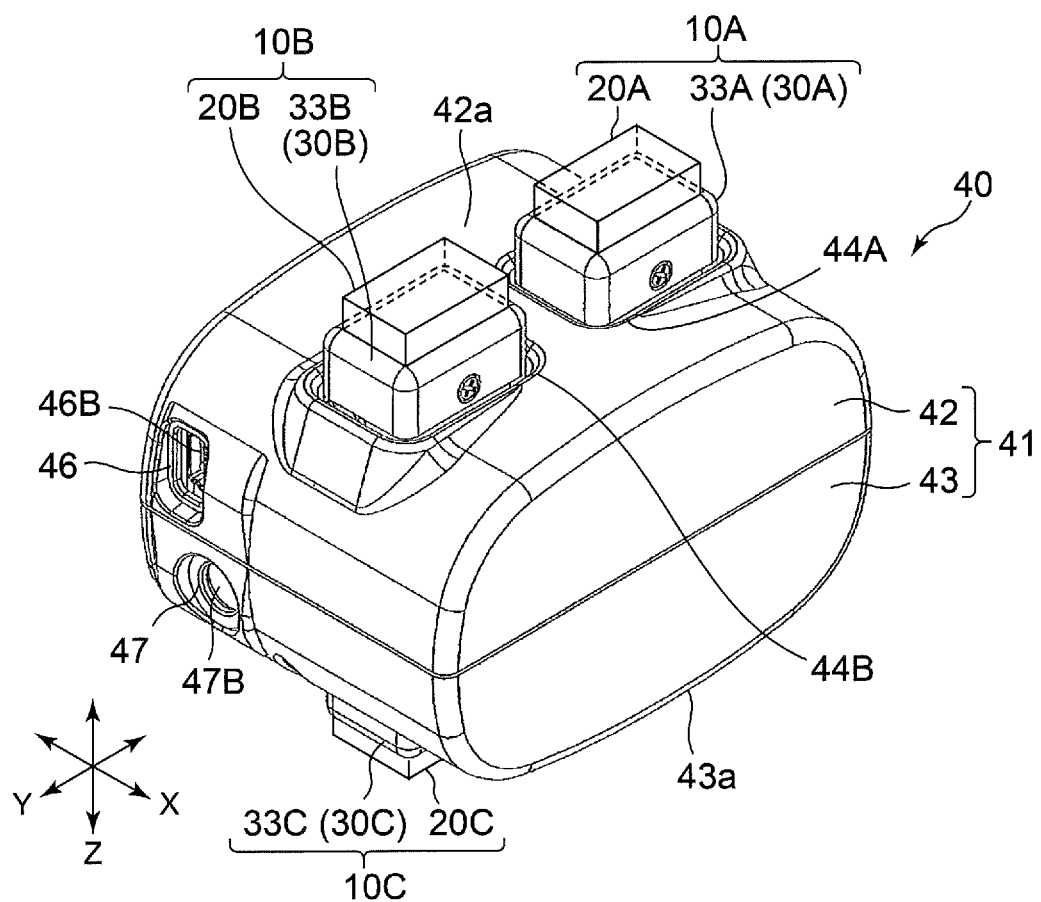
FIG. 6A is a perspective view illustrating the input device as seen from above.
Figure 6B:
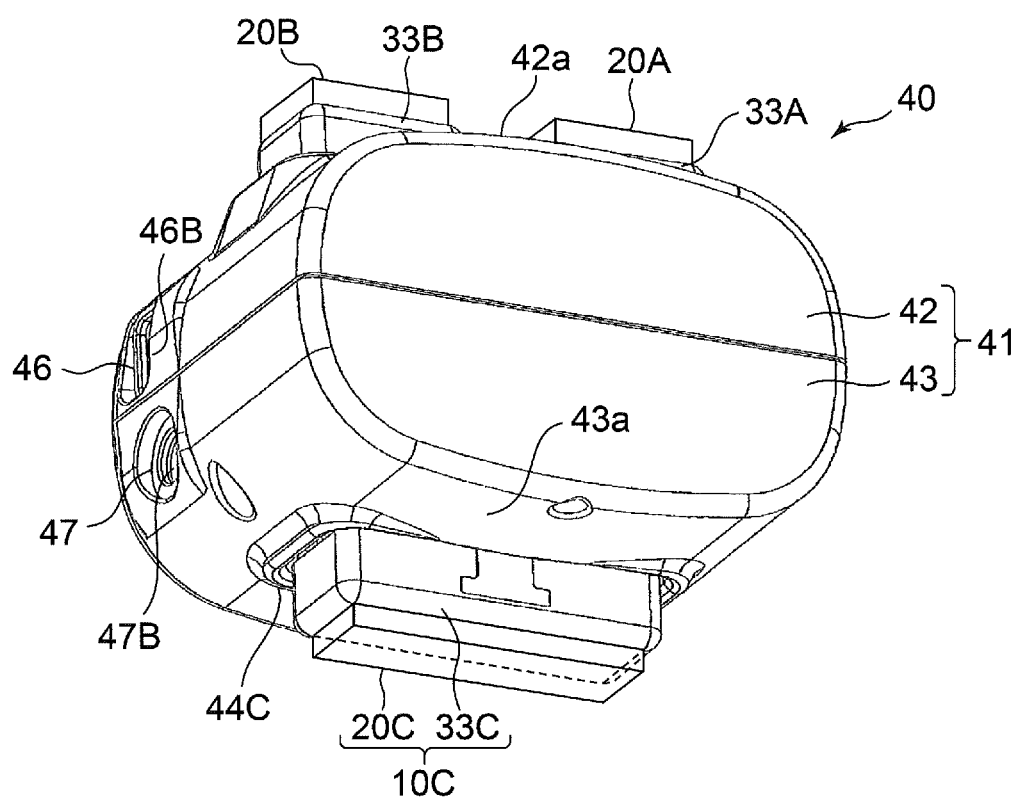
FIG. 6B is a perspective view illustrating the input device as seen from below.
Figure 7:
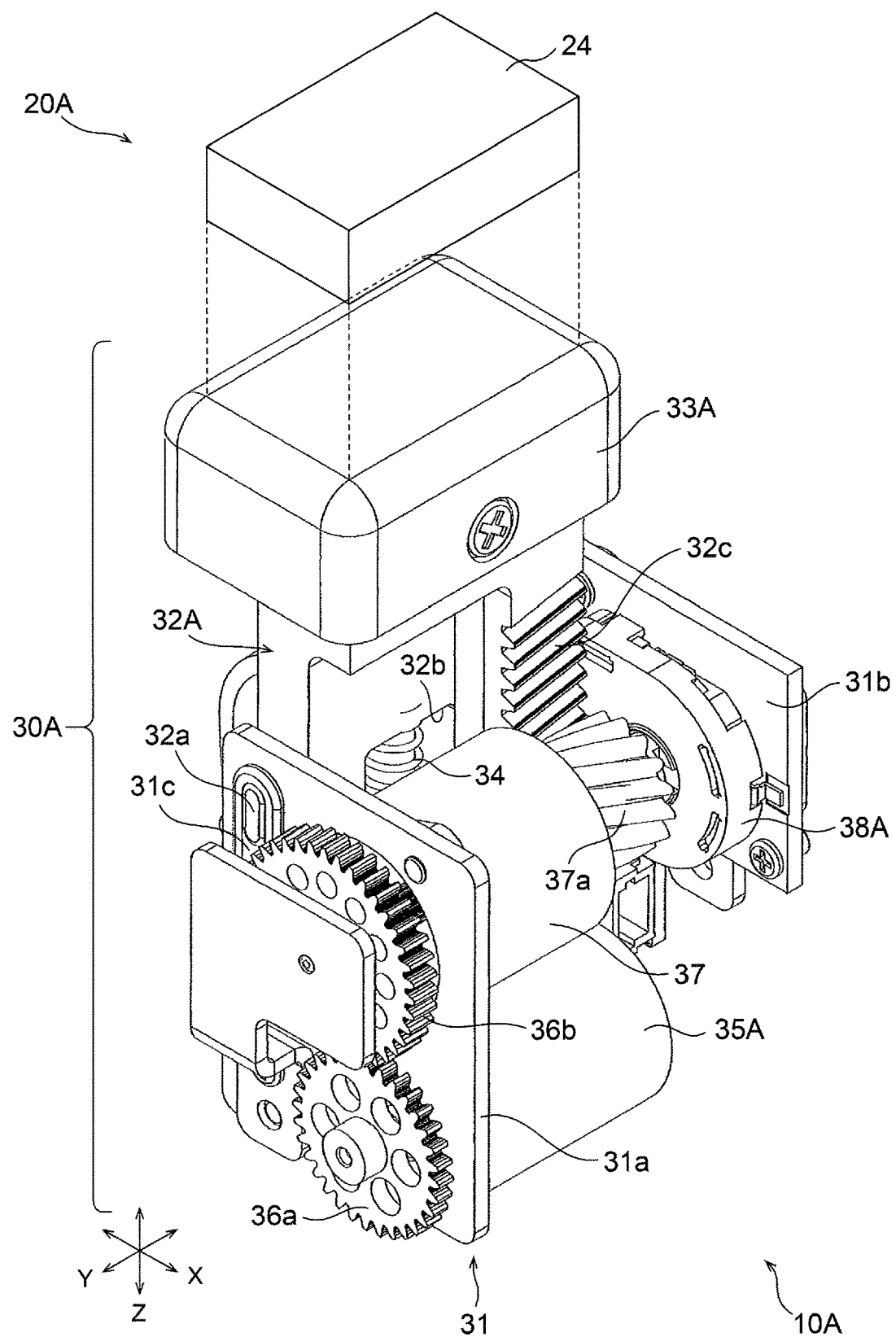
FIG. 7 is an exploded perspective view illustrating a configuration of a tactile sensation presenting device in the input device illustrated in FIGS. 4 to 6.

FIG. 4 is a diagram illustrating an example of first use of an input device 40 and a display device 51A, and FIG. 5 is a diagram illustrating an example of second use of input devices 40 and a display device 51B. FIG. 6A and FIG. 6B are perspective views illustrating a configuration of the input device 40 illustrated in FIG. 4 and FIG. 5. FIG. 6A is a diagram illustrating the input device 40 as viewed from above, and FIG. 6B is a diagram illustrating the input device 40 as viewed from below. FIG. 7 is an exploded perspective view illustrating a configuration of a tactile sensation presenting device 10 in the input device 40 illustrated in FIGS. 4 to 6.

In the first use illustrated in FIG. 4, one input device 40 and the display device 51A are connected to each other by a code 40A and the input device 40 is operated by an operator's right hand. The display device 51A is provided with a display driver circuit 52A for driving the display device 51A, and the display driver circuit 52A is controlled by the control unit 12 (FIG. 3). The display device 51A may be a color liquid crystal display panel, an electroluminescent display panel or the like. The display device 51A may be a personal computer or a display device for demonstration having a relatively large display screen.

In the second use illustrated in FIG. 5, two input devices 40 and the display device 51B are connected to each other by codes 40B and the input devices 40 are operated by operator's right and left hands. The display device 51B is provided with a display driver circuit 52B for driving the display device 51B, and the display driver circuit 52B is controlled by the control unit 12 (FIG. 3). The display device 51B includes a mask-shaped body 511 mounted in front of operator's eyes to display a visible image and a strap 512 for mounting the mask-shaped body 511 on a head.

<Input Device Configuration>

As illustrated in FIG. 6A and FIG. 6B, the input device 40 includes tactile sensation presenting devices 10A, 10B, and 10C. The respective tactile sensation presenting devices 10A, 10B, and 10C include tactile sensation generating units 20A, 20B, and 20C each of which has a configuration similar to that of the tactile sensation generating unit 20 illustrated in FIG. 1 and FIG. 2. In FIGS. 6A and 6B, tactile sensation presenting devices 10A, 10B, and 100 are pressed along the Z direction. In the configuration used as illustrated in FIG. 4 and FIG. 5, each input device 40 is held by the operator's hand with the orientation in which the Y direction of FIG. 6A and FIG. 6B is oriented vertically.

As illustrated in FIG. 6A and FIG. 6B, the input device 40 includes a case 41 made of synthetic resin. The case 41 is of a size that can be held in one hand. The case 41 is configured by combining an upper case 42 and a lower case 43. The upper case 42 and the lower case 43 can be divided in the Z direction. The upper case 42 and the lower case 43 are fixed to each other by screws or the like, and a mechanism housing space is formed in the interior of the two cases 42 and 43.

A surface of the upper case 42 oriented in the Z direction is a first surface 42a, and a surface of the lower case 43 oriented in the Z direction is a second surface 43a. Two operation holes 44A and 44B that penetrate in the Z direction are opened at the first surface 42a in the upper case 42. An operation hole 44c that penetrates the second surface 44a in the Z direction is opened in the lower case 44. The operation holes 44A and 44B are formed side-by-side in the Y direction, and the aperture dimension in the Y direction of the operation hole 44c is larger than that of the operation holes 44A and 44B of the first surface 42a. From the operation hole 44A of the first surface 42a, the tactile sensation generating unit 20A of the tactile sensation presenting device 10A and a support 33A of a pressure sensation generating unit 30A are exposed to be able to be pressed along the Z direction. In addition, from the operation hole 44B, the tactile sensation generating unit 20B of the tactile sensation presenting device 10B and a support 33B of a pressure sensation generating unit 30B are exposed to be able to be pressed along the Z direction. Further, from the operation hole 44C of the second surface 43a, the tactile sensation generating unit 20C of the tactile sensation presenting device 100 and a support 33C of a pressure sensation generating unit 30C are exposed to be able to be pressed along the Z direction. The tactile sensation generating units 20A and 20B are arranged such that the contact detecting unit 24 is on the upper side in the Z direction, and the tactile sensation generating unit 20C is arranged such that the contact detecting unit 24 is on the lower side in the Z direction.

Here, the pressure sensation generating units 30A, 30B, and 30C correspond to the pressure sensation generating unit 30 illustrated in FIG. 1, and the supports 33A, 33B, and 33C correspond to the support 33 illustrated in FIG. 1 and FIG. 2.

A connector mounting hole 46 is opened at the end surface oriented in the Y direction of the upper case 42, and a power plug mounting hole 47 is opened at the end surface oriented in the Y direction of the lower case 43. A signal connector 46B is exposed inside the connector mounting hole 46 such that the code 40A or the code 40B is connected. In addition, a power plug 47B is exposed inside the power plug mounting hole 47 such that a power supply line (not illustrated) is connected.

<Configuration of Tactile Sensation Presenting Device>

Because the tactile sensation presenting devices 10A, 10B, and 10C have similar configurations to each other, here, only the tactile sensation presenting device 10A will be described and the description of the other tactile sensation presenting devices 10B and 10C will be omitted.

As illustrated in FIG. 7, the tactile sensation presenting device 10A includes the pressure sensation detecting unit 30A, which serves as an orientation control unit, and the tactile sensation generating unit 20A fixed such that the vibrating element 21 faces on the support 33A of the pressure sensation detecting unit 30A. The pressure sensation generating unit 30A includes a frame 31 obtained by bending a metal plate. The frame 31 is fixed to a partition plate portion (not illustrated) within the input device 40 such that the tactile sensation presenting device 10A is contained within the input device 40.

The frame 31 is provided with a movable member 32A. The movable member 32A is formed of a synthetic resin material and the support 33A is fixed to the tip portion of the movable member 32A. The support 33A is formed of a synthetic resin material. As illustrated in FIG. 6A, the support 33A protrudes outwardly from the operational hole 44A formed in the upper case 42.

As illustrated in FIG. 7, a guide slot hole 31c extending in the Z direction is formed on one side wall portion 31a of the frame 31. A sliding protruding portion 32a is formed together on the side portion of the movable member 32A, and the sliding protruding portion 32a slides inside the guide slot hole 31c so that the movable member 32A is supported to freely move in the Z direction on the frame 31. Also, the movable member 32A has a recessed portion 32b. Inside the recessed portion 32b, a compression coil spring 34 is interposed between the movable member 32A and the lower end portion of the frame 31. By an elastic force of the compression coil spring 34, the movable member 32A is biased upwardly in the illustrated Z direction, which is a direction in which the support 33A protrudes from the upper case 42.

A motor 35A is fixed to one side wall 31a of the frame 31. As illustrated in FIG. 3, the motor 35A is driven by the motor drive circuit 39A based on a control signal from the control unit 12.

An output gear 36a is fixed to the output shaft of the motor 35A. A reduction gear 36b is rotatably supported on the outer surface of the side wall portion 31a, and the output gear 36a meshes with the reduction gear 36b. A gearbox 37 is fixed to the side wall portion 31a of the frame 31 and a reduction mechanism is contained in the gearbox 37. A rotational force of the reduction gear 36b is reduced by the reduction mechanism in the gear box 37. The reduction mechanism in the gear box 37 is composed of gears such as a sun gear and a planetary gear.

A pinion gear 37a is fixed to the reduction output shaft of the gear box 37. A rack portion 32c is formed on the surface of a thick portion of the movable member 32A, and the pinion gear 37a meshes with the rack portion 32c. The tooth portion of the pinion gear 37a and the tooth portion of the rack portion 32c are helical gear teeth inclined with respect to the Y direction perpendicular to the moving direction of the movable member 32A.

By providing the compression coil spring 34, the backlash between the pinion gear 37a and the rack portion 32c can be eliminated. Note that the compression coil spring 34 may be omitted.

In this embodiment, the motor 35A, the output gear 36a, the reduction gear 36b, the gearbox 37, the pinion gear 37a, and the rack portion 32c constitute a front/back drive unit, and by driving the motor 35A to vertically move the support 33A that serves as an orientation control unit, the tactile sensation presentation surface of the contact detecting unit 24A can be moved.

A position detecting unit 38A is fixed to the other side wall portion 31b of the frame 31. The position detecting unit 38A includes a stator portion (not illustrated) fixed to the side wall portion 31b and a rotor portion (not illustrated) that rotates facing the stator portion. A rotor shaft provided in the rotor portion rotates together with the pinion gear 37a. The position detecting unit 38A is of a resistance-change type, and a circular arc-shaped resistor pattern is provided on the stator portion, and a slider that slides the resistor pattern is provided on the rotor portion. The position detecting unit 38A is connected to the control unit 12, and in the control unit 12, a position of the tactile sensation presentation surface on the contact detecting unit 24A of the tactile sensation generating unit 20A fixed on the support 33A is calculated based on the detection result.

Note that the position detecting unit 38A may be of a magnetic detection type, and a rotating magnet may be fixed to a rotor portion, and a magnetic detection element such as a GMR element may be provided on a stator portion, and a rotation angle of the rotor portion may be detected by the magnetic detection element. Alternatively, the position detecting unit 38A may be an optical position detecting unit.

As illustrated in FIG. 6A and FIG. 6B, the tactile sensation generating unit 20A is fixed to the upper surface of the first support 33A, the second tactile sensation generating unit 20B is fixed to the upper surface of the second support 33B, and the third tactile sensation generating unit 20C is fixed to the bottom surface of the third support 33C.

An orientation detecting unit (not illustrated) is provided inside the case 41 of the input device 40. The orientation detecting unit is, for example, a magnetic sensor that detects a geomagnetic sensor, or a vibrational gyro device, and can detect an orientation in the operation space of the input device 40 and a position in the operation space.

In the pressure sensation generating unit 30A, by controlling the rotation of the motor 35A, it is possible to move the movable member 32A to a desired position and stop the movable member 32A at the desired position. For example, it is possible to stop the support 33A at the position where the support 33A maximally protrudes from the case 41, or it is possible to stop the support 33A at the position where the support 33A maximally retracts in the case 41. In addition, it is also possible to stop the support 33A at a desired position between the maximum protruding position and the maximum retracting position. Accordingly, it is possible to provide pressure information to the tactile sensation generating unit 20 fixed on the support 33A and to present the pressure information on the contact detecting unit 24 as the tactile sensation presentation surface.

Also, by controlling electric power applied to the motor 35A, the rotor of the motor 35A can be maintained by a strong force so that the support 33A protruding from the case 41 is not moved even being pushed by a finger.

Furthermore, it is preferable that a vertical movement of the support 33A by rotation of the motor 35A is performed at a frequency and amplitude (displacement amount) different from those of vibration by the vibrating element 21. For example, by causing the vibrating element 21 to generate vibration information at a frequency of three times the frequency of a vertical movement of the support 33A and at the same time, by making the amplitude of the vibration generated by the vibrating element 21 $1/10$ of the displacement amount of the support 33A, a finer tactile sensation can be presented.

When the movable member 32A is in a movable state, upon the support 33A being pushed such that the movable member 32A moves in the push direction, the movement position is detected by the position detecting unit 38A and the detection output is applied to the control unit 12. The control unit 12 holds data on a reaction force action line (reaction force action coefficient) indicating the relationship between the movement distance and the reaction force for reaction force application control, and the motor 35A is controlled to generate a torque corresponding to the reaction force action line in accordance with the push position of the support 33A. Thereby, a reaction force is applied to the finger pressing the support 33A.

Next, an example of operation and tactile sensation presentation of the tactile sensation presenting device 10 will be described. The following example describes an operation of the tactile sensation presenting device 10A of the input device 40, but the same applies to the tactile sensation presenting devices 10B and 10C.

When it is detected that a finger has come into contact with the contact detecting unit 24 or when it is detected that a predetermined operation has been performed by movement of a finger in contact with the contact detecting unit 24, based on the detection result, the control unit 12 (1) applies a warmth/coldness control signal to the Peltier element drive circuit 26 for causing the Peltier element to present warm/cold information; (2) applies a vibration control signal to the vibrating element drive circuit 25 for causing the vibrating element 21 to present vibration information; (3) applies a control signal to the motor drive circuit 39A for driving the motor 35A; and (4) applies a display control signal to the display driver circuit 52A for causing the display device 51A to display predetermined information or applies a display control signal to the display driver circuit 52B for causing the display device 51B to display predetermined information.

Also, when the tactile sensation generating unit 20 is pushed to move the support 33A and the movable member 32A in the push direction and a positional change due to this movement is detected by the position detecting unit 38A, the control unit 12 also applies, in accordance with the detection result, a control signal to each of the Peltier element drive circuit 26, the vibrating element drive circuit 25, the motor drive circuit 39A, and the display driver circuit 52A (52B).

At Peltier element drive circuit 26, a drive signal is generated according to the applied warmth/coldness control signal and the generated drive signal is applied to Peltier element 23. This changes the heat amount on the surface 23a of the Peltier element 23. Thereby, the temperature sensed by the finger through the contact detecting unit 24 rises/falls, and warm/cold information is presented to the finger.

At the vibrating element drive circuit 25, a drive signal is generated according to the applied vibration control signal and the generated drive signal is applied to the vibrating element 21. Thereby, vibration is generated at the vibrating element 21, and the vibration at the vibrating element 21 is applied through the conductive member 22, the Peltier element 23, and the contact detecting unit 24 to the finger as vibration information.

At the motor drive circuit 39A, a drive signal is generated according to the applied motor control signal and the generated drive signal is applied to motor 35A. Thereby, the support 33A moves along the Z direction or the support 33A in a movable state is fixed. As a result, pressure information is presented to the finger contacting the contact detecting unit 24 through the tactile sensation generating unit 20 on the support 33A.

Here, the vibration information by the vibrating element 21, the warm/cold information by the Peltier element 23, and the pressure information by the motor 35A can be combined as desired.

At the display driver circuit 52A (52B), a drive signal is generated according to the applied display control signal and the generated drive signal is applied to the display device 51A (51B). Thereby, for example, it is possible to change the displayed image depending on the touch of the finger, the movement of the operation, the pressing action, and the like.

As described above, according to the tactile sensation presenting device of the above described embodiment, it is possible to provide, to a finger contacting the surface of the tactile sensation generating unit 20, information obtained by combining as desired vibration information, warm/cold information, and pressure information in accordance with an operation state of the finger. Thus, it is possible to present finer and complex tactile sensations, and it is possible to provide a realistic tactile sensation corresponding to an image displayed on the display device 51A or 51B.

In the following, a modified example will be described.

Figure 8:
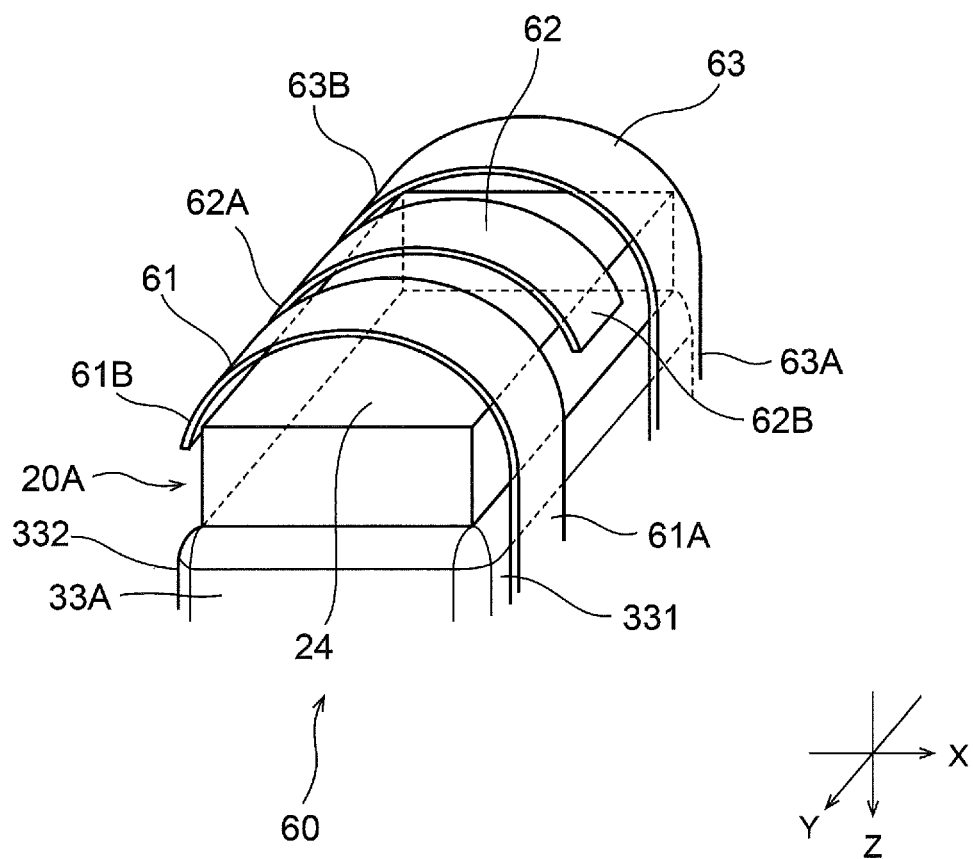
FIG. 8 is a perspective view illustrating a schematic configuration of a tactile sensation presenting device according to a modified example.
Figure 9:
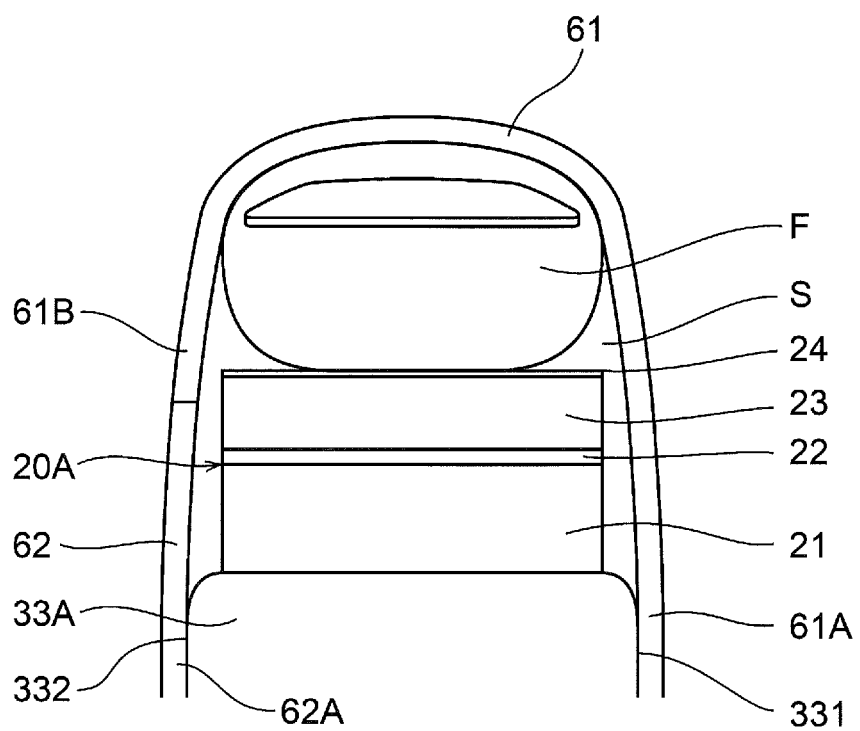
FIG. 9 is a side view when a finger is in contact with the tactile sensation presenting device illustrated in FIG. 8.

FIG. 8 is a perspective view illustrating a schematic configuration of a tactile sensation presenting device 60 according to a modified example, and FIG. 9 is a side view when a finger is in contact with the tactile sensation presenting device 60 illustrated in FIG. 8. Although the example illustrated in FIG. 8 and FIG. 9 is a modified example with respect to the tactile sensation presenting device 10A illustrated in FIGS. 6 and 7, a similar modification may be made with respect to the tactile sensation presenting devices 10B and 10C.

As illustrated in FIG. 8 and FIG. 9, in addition to the tactile sensation generating unit 20A and the pressure sensation generating unit 30 according to the first embodiment as described above, the tactile sensation presenting device 60 includes three elastic holding members 61, 62, and 63 that hold a contact state of a finger in contact with the contact detecting unit 24 of the tactile sensation presenting unit 20A. These elastic holding members 61, 62, and 63 are sequentially arranged at a constant interval in the Y direction and each of the elastic holding members 61, 62, and 63 extends along the X direction in a belt-like fashion. Each of an end portion 61A of the belt-like first elastic holding member 61 and an end portion 63A of the belt-like third elastic holding member 63 is fixed to a side surface 331 of the support 33. The first elastic holding member 61 and the third elastic holding member 63 bend and extend so as to protrude upward in the Z direction and form a space S1 (FIG. 9) with the contact detecting unit 24 of the tactile sensation generating unit 20A. Further, each of tip end portions 61B and 63B extends in the X direction to a side surface 332 opposite the side surface 331. Also, an end portion 62A of the belt-like second elastic holding member 62 is fixed to the side surface 332. The second elastic holding member 62 bends and extends so as to protrude upward in the Z direction and form the space S1 with the contact detecting unit 24 of the tactile sensation generating unit 20A. A tip portion 62B extends to the side surface 331. The elastic holding members 61, 62, and 63 and the support 33A are fixed by adhesion or the like.

The three elastic holding members 61, 62, and 63 are composed of an elastic material, such as a rubber material, a sponge material, or a spring material, for example. The three elastic holding members 61, 62, and 63 have an elastic force so that when an operator's finger F is inserted into the space S1 between the elastic holding members 61, 62, and 63 and the contact detecting unit 24, the finger F is pressed from above toward the contact detecting unit 24 (see FIG. 9). Thereby, it is possible to ensure that the finger F and the contact detecting unit 24 are in contact with each other, it is possible to accurately transmit, to the finger F, a fine tactile sensation presented on the contact detecting unit 24. Also, because the first elastic holding member 61 and the third elastic holding member 63 and the second elastic holding member 62 are fixed to different sides surfaces of the support 33A, the finger F can be restrained in a balanced manner. Further, because the elastic holding members 61, 62, and 63 are arranged with an interval in the Y direction, a finger F is easily inserted into the space S1 between the elastic holding members 61, 62, and 63 and the contact detecting unit 24, and the feeling of pressure applied to the finger F can be reduced.

Note that the shapes, the number, and the arrangement of elastic holding members are not limited to those illustrated in FIG. 8 and FIG. 9 as long as the elastic holding members can push and maintain a finger, inserted in the space S1, against the contact detecting unit 24.

In a case in which a Peltier element, serving as a warm stimulation unit to apply a warm stimulus to an operating part (such as a hand or a finger) touching the Peltier element in order to cause the operating part to feel a warm temperature, and a Peltier element, serving as a cold stimulation unit to apply a cold stimulus in order to cause the operating part to feel a cold temperature, are disposed alternately, even if a combination of stimuli of temperatures (such as 20° C. and 40° C.) that does not cause a sense of pain is presented, a sense of pain occurs (Thermal Grill Illusion). For example, when a warm stimulus and a cold stimulus, which are greater than a certain level such as 4° C./s or higher, are presented simultaneously from the above-described the warm stimulation unit and the cold stimulation unit, a sense of pain can be caused.

Further, a temperature of skin of a finger before a warm/cold stimulus is applied by contacting a Peltier element (an acclimation temperature) affects sensitivity (threshold) to warmth and coldness. Here, with respect to the acclimation temperature, when it is desired to present warmth, as the temperature of a fingertip touching the Peltier element is higher, sensitivity to warmth is higher. When it is desired to present coldness, as the temperature of a fingertip touching the Peltier element is lower, sensitivity to coldness is higher. In other words, as the acclimation temperature is higher, the finger senses a warm stimulus more easily, and as the acclimation temperature is lower, the finger senses a cold stimulus more easily. Thus, by using a temperature detecting element (not illustrated) to accurately measure a skin temperature of a finger and by driving the Peltier element to increase or decrease the skin temperature based on the measured result, a warm/cold stimulus can be clearly presented with small variation of temperature. For example, in a case of desiring to present warmth, when the temperature of a fingertip is 32° C., setting 34° C., which is higher by 2° C., causes the fingertip to feel "warm", and when the temperature of a fingertip is 35° C., only setting 36° C., which is higher by 1° C., causes the fingertip to feel "warm". In a case of desiring to present coldness, when the temperature of a fingertip is 32° C., setting 31° C., which is lower by 1° C., causes the fingertip to feel "cold", and when the temperature of a fingertip is 29° C., only setting 28.5° C., which is lower by 0.5° C., causes the fingertip to feel "cold".

Second Embodiment

Figure 10:
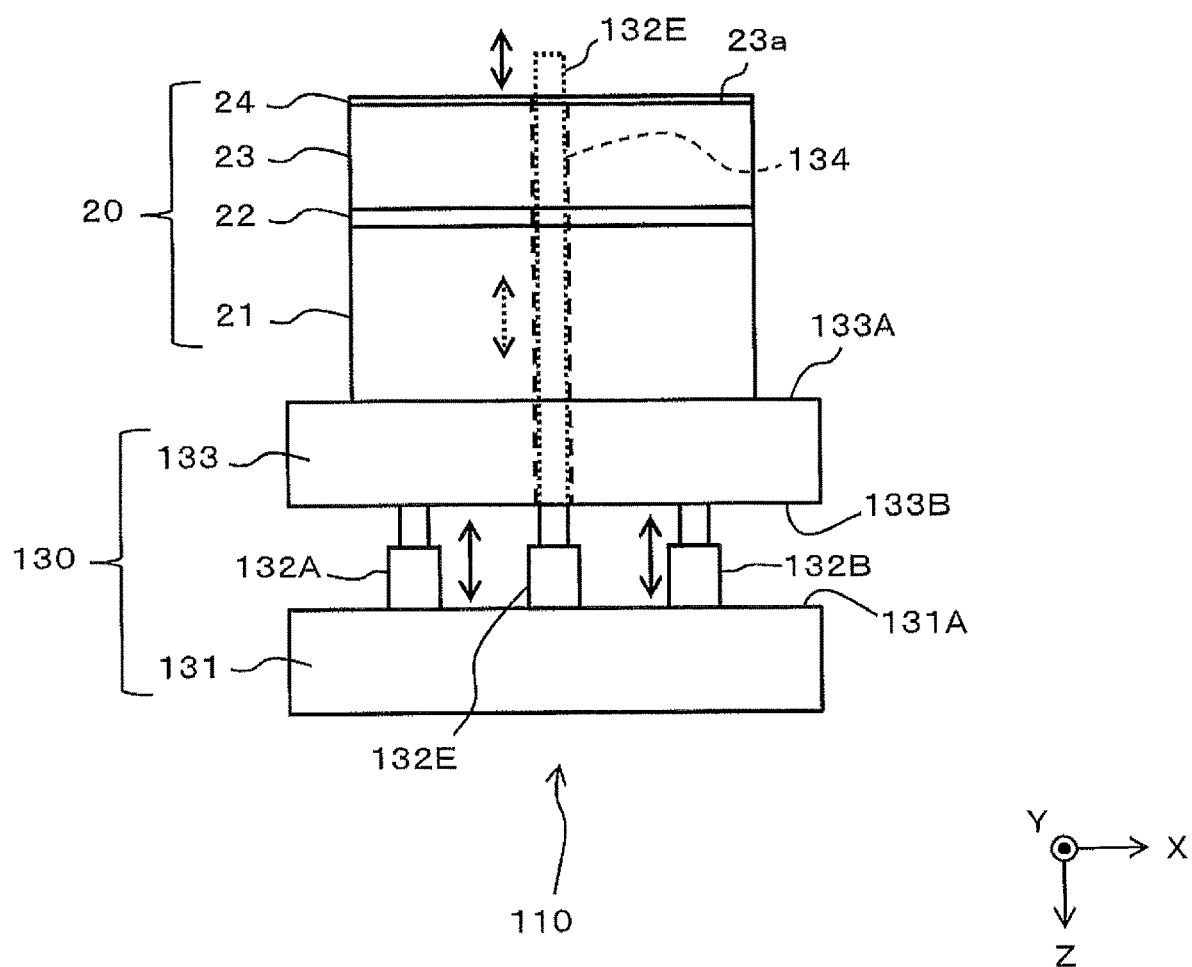
FIG. 10 is a side view illustrating a schematic configuration of a tactile sensation presenting device according to a second embodiment.
Figure 11:
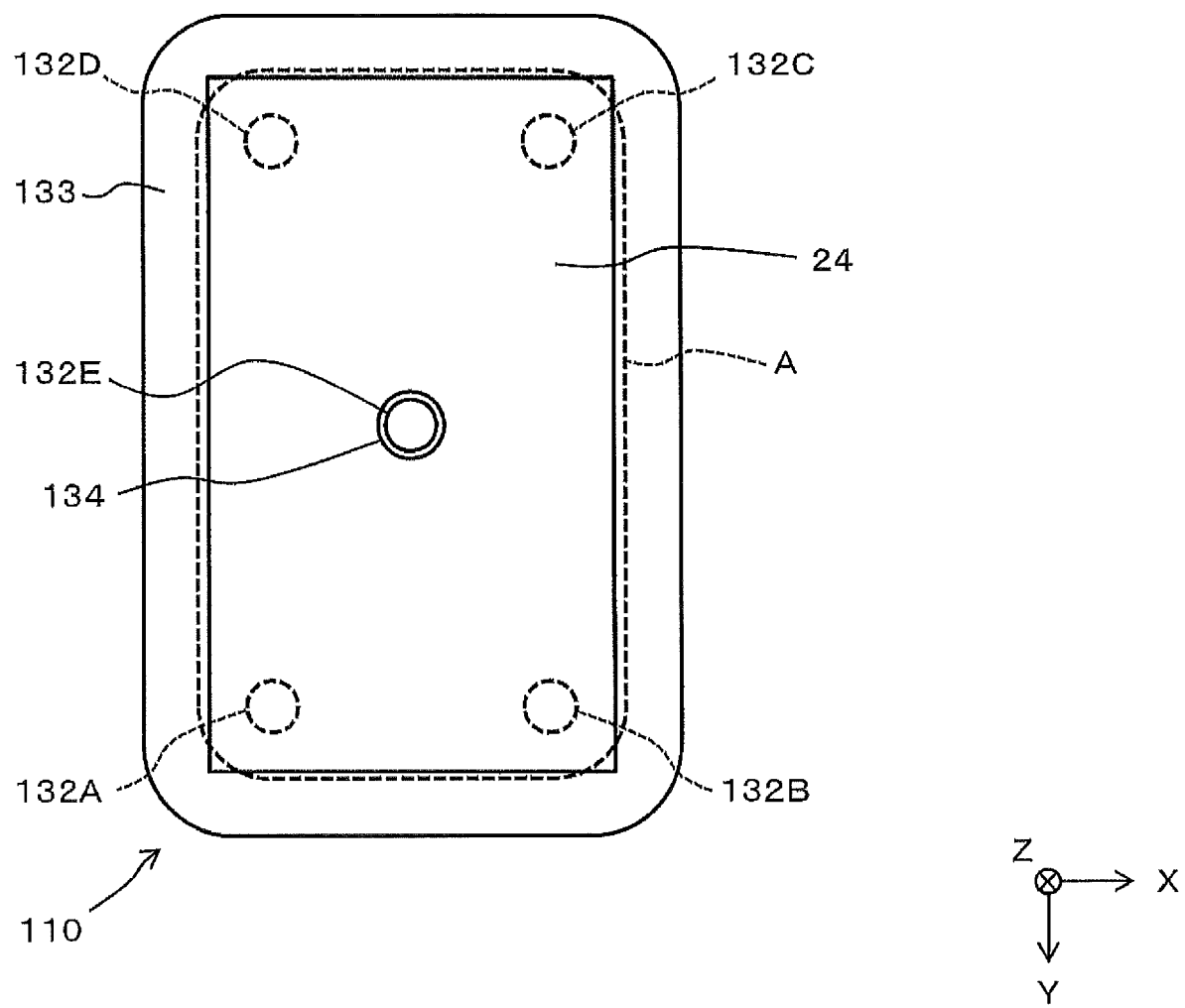
FIG. 11 is a plan view of the tactile sensation presenting device that is illustrated in FIG. 10.

FIG. 10 is a side view illustrating a schematic configuration of a tactile sensation presenting device 110 according to a second embodiment, and FIG. 11 is a plan view illustrating a schematic configuration of the tactile sensation presenting device 110 according to the second embodiment.

The tactile sensation presenting device 110 of the second embodiment differs from that of the first embodiment in that a pressure sensation generating unit 130 capable of tilting the tactile sensation generating unit 20 is used instead of the pressure sensation generating unit 30A, 30B, or 30C of the first embodiment. Because the contact area A and the configuration of the tactile sensation generating unit 20 are similar to those in the first embodiment, the same reference numerals are used.

As illustrated in FIG. 10 or FIG. 11, the pressure sensation generating unit 130 includes a fixed member 131, five pin-shaped air cylinders 132A, 132B, 132C, 132D, and 132E disposed on the fixed member 131, and a base member 133 supported by four air cylinders 132A to 132D of these. The fixed member 131 and the base member 133 have a rectangular shape in plan view and are formed of a synthetic resin material. On the upper surface 133A of the base member 133, the tactile sensation generating unit 20 is fixed.

The four respective air cylinders 132A, 132B, 132C, and 132D can expand and contract along the Z direction, and the lower portions of the respective air cylinders 132A, 132B, 132C, and 132D are fixed to the upper surface 131A of the fixed member 131 and the upper end surfaces of the respective air cylinders 132A, 132B, 132C, and 132D are fixed to the lower surface 133B of the base member 133. As illustrated in FIG. 11, these air cylinders 132A to 132D are arranged at respective positions corresponding to four corner portions of the vibrating element 21 having a rectangular shape in plan view and are driven independently of each other in accordance with control signals from the control unit 12. Accordingly, the tactile sensation generating unit 20 fixed on the base member 133 moves along the Z direction when the amounts of expansion/contraction of the air cylinders 132A to 132D are equal to each other. Also, when the respective amounts of expansion/contraction of the air cylinders 132A to 132D are different, the tactile sensation generating unit 20 tilts to form a predetermined angle based on the differences in the amounts of expansion/contraction. That is, the pressure sensation generating unit 130 moves up and down or tilts the tactile sensation generating unit 20 as an orientation control unit.

Also, the tactile sensation generating unit 20 and the base member 133 may be composed of a sponge or other soft material such that, in accordance with vertical movements of the four air cylinders 132A, 132B, 132C, and 132D as thrust pins, respective corresponding portions of the surface of the contact detecting unit 24 can be deformed in the Z direction (vertical direction). In this case, because not only the tactile sensation generating unit 20 can be tilted and vertically moved but also the shape of the tactile sensation presentation surface of the contact detection unit 24 can be changed, finer pressure information can be presented.

The air cylinder 132E is inserted in a hole 134 penetrating the base member 133, the vibrating element 21, the conductive member 22, the Peltier element 23, and the contact detecting unit 24 along the Z direction. The air cylinder 132E can expand and contract along the Z direction, and the lower portion of the air cylinder 132E is fixed to the upper surface 131A of the fixed member 131. Although it is arranged at the center of the contact detecting unit 24 in plan view in the example illustrated in FIG. 10 and FIG. 11, the number and arrangement of hole portions and air cylinders inserted therein are not limited to the illustrated example.

The air cylinder 132E is driven in accordance with a control signal from the control unit 12 and serves as a thrust pin to be able to realize two states: an expanded state of protruding upward with respect to the contact detecting unit 24 and a contracted state of being contained in the tactile sensation generating unit 20. Thereby, because a pin shape can be thrust up directly against a finger, for example, a protruding-recessed sensation can be presented by combining a plurality of pins. Further, the expansion and contraction of the air cylinder 132E is not limited to the two states described above. By controlling three or more expansion/contraction states, more complex pressure information can be presented.

Here, the number and arrangement of air cylinders can set as desired. Alternatively, instead of the air cylinders, it is possible to use a plurality of actuators that can be displaced along the Z direction by water pressure or piezoelectric effect.

In addition, by arranging the pressure sensation generating unit 130 in the state of supporting the tactile sensation generating unit 20 on the pressure sensation generating unit 30 of the first embodiment, presentations of pressure information by the two pressure sensation generating units 30 and 130 may be combined.

Note that other functions, effects, and modifications are similar to those in the first embodiment.

Although the present invention has been described with reference to the above described embodiments, the present invention is not limited to the above described embodiments. Various enhancements or changes can be made within the scope of the present invention.

INDUSTRIAL APPLICABILITY

As described above, a tactile sensation presenting device according to an aspect of the present invention is useful in that it is possible to present vibration information, warm/cold information, and pressure information, and it is possible to present a finer tactile sensation.

What is claimed is:

1. A tactile sensation presenting device comprising:
a pressure sensation generating unit configured to present pressure information; and
a tactile sensation generating unit arranged on the pressure sensation generating unit,
wherein the tactile sensation generating unit includes a vibrating element configured to present vibration information,
wherein the tactile sensation generating unit includes a warmth/coldness presenting element provided above the vibrating element and configured to present warm/cold information, and
wherein the vibration information, the warm/cold information, and the pressure information are presented to an operating part in contact with a tactile sensation presentation surface of the tactile sensation generating unit.

2. The tactile sensation presenting device according to claim 1, further comprising:
an operation information obtaining unit configured to obtain operation information of the operating part in contact with the tactile sensation presentation surface,
wherein at least one of the vibration information, the warm/cold information, and the pressure information is controlled based on the operation information obtained by the operation information obtaining unit.

3. The tactile sensation presenting device according to claim 2, wherein the pressure sensation generating unit includes an orientation control unit configured to control an orientation of the tactile sensation presentation surface based on the operation information.

4. The tactile sensation presenting device according to claim 3, wherein the orientation control unit tilts the tactile sensation presentation surface.

5. The tactile sensation presenting device according to claim 3, wherein the orientation control unit vertically moves the tactile sensation presentation surface.

6. The tactile sensation presenting device according to claim 2, wherein the pressure sensation generating unit includes a shape control unit configured to control a shape of the tactile sensation presentation surface based on the operation information.

7. The tactile sensation presenting device according to claim 6, wherein the shape control unit includes a plurality of vertically movable thrust pins and vertically moves the plurality of respective thrust pins to change the shape of the tactile sensation presentation surface.

8. The tactile sensation presenting device according to claim 1, wherein the warmth/coldness presenting element is a Peltier element.

9. The tactile sensation presenting device according to claim 8,
wherein a conductive member is arranged between the Peltier element and the vibrating element,
wherein the conductive member includes a thermally conductive member that conducts, to the vibrating element, heat that is generated when the Peltier element presents the warm/cold information, and
wherein the conductive member includes a vibration conductive member that conducts, to the Peltier element, the vibration information presented by the vibrating element.

10. The tactile sensation presenting device according to claim 9, wherein the conductive member has an adhesive property, and couples the Peltier element to the vibrating element.

11. The tactile sensation presenting device according to claim 10,
wherein the vibrating element includes a metal cover, and
wherein the conductive member couples the metal cover and the Peltier element.

* * * * *